US008250624B2

(12) United States Patent
Lamotte

(10) Patent No.: US 8,250,624 B2
(45) Date of Patent: Aug. 21, 2012

(54) PORTABLE DEVICE FOR SECURING PACKET TRAFFIC IN A HOST PLATFORM

(75) Inventor: Thierry Lamotte, Greasque (FR)

(73) Assignee: Gemalto SA, Meudon (FR)

( * ) Notice: Subject to any disclaimer, the term of this patent is extended or adjusted under 35 U.S.C. 154(b) by 2859 days.

(21) Appl. No.: 10/471,562

(22) PCT Filed: Feb. 8, 2002

(86) PCT No.: PCT/FR02/00494
§ 371 (c)(1),
(2), (4) Date: Sep. 12, 2003

(87) PCT Pub. No.: WO02/073930
PCT Pub. Date: Sep. 19, 2002

(65) Prior Publication Data
US 2004/0088567 A1    May 6, 2004

(30) Foreign Application Priority Data
Mar. 14, 2001    (FR) ...................................... 01 03648

(51) Int. Cl.
*G06F 17/00* (2006.01)
(52) U.S. Cl. .......................................................... 726/1
(58) Field of Classification Search .................. 713/160, 713/150; 726/9, 1
See application file for complete search history.

(56) References Cited

U.S. PATENT DOCUMENTS

| 6,067,620 A * | 5/2000 | Holden et al. ................ 713/155 |
| 6,141,752 A | 10/2000 | Dancs et al. |
| 6,557,104 B2 * | 4/2003 | Vu et al. ........................ 713/189 |
| 6,577,229 B1 * | 6/2003 | Bonneau et al. ........... 340/10.41 |
| 7,143,282 B2 | 11/2006 | Takagi et al. |

FOREIGN PATENT DOCUMENTS

| EP | 1094682 A1 | 4/2001 |
| JP | 61205041 | 9/1986 |
| JP | 9219700 | 8/1997 |
| JP | 10224339 | 8/1998 |
| JP | 11168511 | 6/1999 |
| JP | 2000315997 | 11/2000 |
| JP | 2000324104 | 11/2000 |
| JP | 2001298449 | 10/2001 |
| JP | 2001518664 | 10/2001 |
| JP | 2001333110 | 11/2001 |
| JP | 2002261829 | 9/2002 |
| WO | WO97/00471 | 1/1997 |

OTHER PUBLICATIONS

English-language translation of Interrogatory dated May 12, 2009 in corresponding JP 2002-571681, 3 pps.
English-language translation of Notice of Rejection Reasons dated May 16, 2006 in corresponding JP 2002-571681, 2 pps.

* cited by examiner

*Primary Examiner* — Ellen Tran
(74) *Attorney, Agent, or Firm* — Buchanan Ingersoll & Rooney PC

(57) ABSTRACT

A device, such as a chip card, is connected to a host platform that is linked to a packet network such as the Internet. The device detects security policy designation parameters in packets leaving and entering the platform and processes the packets according to stored security policies designated by the designation parameters detected. The security information linked to a user can therefore be moved from one platform to another and it is not processed by the platform. Security policies are managed by a server with which the device can initiate a communication when no security policy corresponding to the policy designation parameters detected in a packet is recognized, so that the server can assist the device in negotiating a security policy.

15 Claims, 2 Drawing Sheets

PORTABLE DEVICE FOR SECURING PACKET TRAFFIC IN A HOST PLATFORM

This disclosure is based upon French Application No. 01/03648, filed on Mar. 14, 2001, and International Application No. PCT/FR02/00494, filed Feb. 8, 2002, the contents of which are incorporated herein by reference.

BACKGROUND OF THE INVENTION

The present invention relates in general terms to the security of packets transmitted in packet networks such as the Internet.

More particularly it relates to the security of IP packets transmitted from and received by a host platform such as a personal digital assistant, a mobile radiotelephone, a portable computer, etc., as well as the mobility of security information acting on the packet traffic and linked to a user using the host platform.

At present, the security between two platforms communicating with one another through any telecommunications network whatsoever is implemented in certain protocol layers of the OSI (Open Systems Interconnection) model. As shown in FIGS. 1A and 1B, amongst the seven layers C1 to C7 of the OSI model, one of the layers C2, C3, C4 and C7 in each of the platforms implements security means.

Regarding the application layer C7, for example for applications APPLI1 to APPLI6 linking a smart card and a reception terminal as host platform, such as a credit card and a bank terminal, or such as a SIM (Subscriber Identity Module) card and a radiotelephone terminal, the security means are installed on an application in the reception terminal, such as the application APPLI1. A particular application, for example an Internet browser, by means of which the user easily accesses his personal security information, is thus secured. The security linked to an application is not dependent on the hardware constituting the reception terminal. However, security means must be duplicated on each of the applications APPLI1 to APPLI6 used in the terminal. This solution does not provide portability of the information linked to the security of the user beyond the application in which this solution has been specifically provided.

Regarding the transport layer C4 making it possible to send messages from one application to another application for example by means of the UDP protocol (User Datagram Protocol) or the TCP protocol (Transmission Control Protocol), security means implemented in one (TCP) of the transport protocols advantageously remedies the duplication of security means in each of the applications APPLI1 to APPLI6 which in this case all have the benefit of these security means. In this solution, the security means are firmly attached to the platform and not to the user thereof although he must be authenticated as often as possible in order to be able to use it. If another transport protocol, such as the UDP protocol, has to be secured, it is then necessary to duplicate the security means in the other UDP transport protocol in the same way as in the first TCP protocol. This second known solution also does not provide portability of the information linked to the security of the user.

Regarding the network layer C3 occupied for example by the Internet protocol IP, the implementation of security means in this layer has many advantages. As security means are processed at a single "funnel" point of the stack of protocols, management of the security means and the keys associated therewith is optimised. The software programs implementing security means in the higher layers C4 to C7 can thus advantageously not implement security means by relying on the single security of the layer C3. All the applications as well as the various transport protocols have the benefit of the security means almost transparently. However, just as in the case of the layer C4, the security means are firmly attached to the platform and not a user. In the present case, these security means "become remote" from the user even more. Like the other solutions, this third solution also does not provide portability of the information linked to the security of the user.

Regarding the data link layer C2 in which three protocols P1, P2 and P3 for example are implemented, this fourth solution has the disadvantage of being highly linked to the hardware infrastructure and provides security means which are much poorer and less flexible than those provided in the layer C3.

The implementations of security means in the aforementioned layers C2, C3, C4 and C7 show that, the lower the layer of the OSI model in which the implementation is carried out, the greater the extent to which the overall security is transparent and provided for all the applications in the platform. On the other hand, the security means are profoundly linked to the platform and therefore become more remote from the user with regard to the personalised services with which he can be provided and to the certainty on the identity of the user who is using the platform.

At present, applications using two main types of smart card, referred to as microcontroller cards, as an electronic portable device, provide a portability of security parameters linked to a given user, the security means being implemented in at least one application in the application layer C7 of the OSI model.

In a first type of smart card relating to a SIM (Subscriber Identity Module) identity card removable from a radiotelephone terminal acting as host platform, cryptographic keys are stored in the smart card. The smart card authenticates the user without the cryptographic keys being known outside the card. Thus, advantageously, the smart card is intimately linked to its owner/user and the personal security data of the user are easily portable from one platform to another. This also facilitates the deployment of the application.

However, the commands are issued by the application which is implemented outside the card. A key referred to as a session key is generated inside the card. The session key is transmitted by the smart card to the outside thereof, to the reception terminal which subsequently uses this session key for encrypting the communication. Once this session key has been supplied outside the card, the card no longer has control of the use of the key in particular as regards duration. The smart card is therefore not in a position to provide the user with total security of the data exchanged with regard to the use which will subsequently be made of his own keys.

Moreover, the reception terminal external to the card must take on board software which contains the major part of the application, the card being principally used here only for storing keys and providing cryptographic calculations. The decision-making aspects of the application are localised and reserved for the terminal outside the smart card, which gives it a relatively limited responsibility.

For a smart card of the second type connected to the host platform such as a personal computer PC, the smart card is used in particular in secure electronic mail applications using an electronic signature and electronic mail message encryption. For this second type, the smart card stores public cryptographic keys as well as a private key and certificate intimately linked to the user owning the card and is used for his cryptographic calculations producing message signatures. The personal security data of the user in the card are again easily portable from one platform to another. The deployment of the public key infrastructure is thus facilitated.

As each encryption session key is decrypted by the smart card and supplied to the host platform, trust on the subsequent use of the encryption/decryption keys supplied by the card rests essentially on the host platform to which the card is connected in particular during decision-making and data encryption phases. The computer external to the card must also take on board the software containing the major part of the application, the card being used only for containing keys and providing cryptographic calculations. The decision-making aspects of the application are again localised and reserved for the outside world, that is to say for the computer external to the smart card.

For the previous two types of smart card, a smart card is comparable to a portable safe which can be opened through the knowledge of a combination, such as authentication of its holder/user by PIN identification code for example, which allows generation of a new session key by the card which is then supplied to the host platform. The trust then rests partly on the platform receiving the smart card.

Moreover, within the context of a large number of terminals providing connections to the global network, the previous two types of smart card are not satisfactory in terms of interoperability because of the security in particular implemented at application level and because of the applications which are most often proprietary.

The IPSec Internet security domain organised by the IETF authority defines an implementation of security means at the level of the network layer C3 of the OSI model. The RFC2401 comments "IPSec architecture" of the IETF authority recommend in particular a host implementation which can be an "OS Integration" implementation which is integrated with the operating system of the host platform, or a "Bump-In-The-Stack" (BITS) implementation which is inserted between the network layer C3 and the link layer C2.

One of the major drawbacks of the IPSec security means implementation lies in the deployment and management of the public key infrastructure which is relatively complex. By implementing the security at the level of the network layer C3, the notion of the user who is using the platform is lost, the network layer securing a network node but not the particular user. The security parameters are attached to a platform and are not portable to another platform.

SUMMARY OF THE INVENTION

The objective of the present invention is to remedy the drawbacks of the security systems according to the aforementioned prior art. More precisely, it aims to provide a portable security device securing the traffic in a platform while providing portability of information linked to the security of the user, as in the smart card of the second type, but also of parameters linked to packet processing, independently of the applications in the host platform, thus facilitating the deployment of the management of keys.

To that end, a portable electronic device connected in a removable manner to a host platform linked to a packet network is characterised in that it comprises a means for storing security policies, a means for detecting security policy designation parameters in packets outgoing from the platform to the network and packets transmitted by the network and incoming to the platform, and a means for processing the outgoing and incoming packets respectively according to security policies designated by the detected designation parameters.

The portable electronic device of the invention, such as a smart card, not only contains security data and performs cryptographic calculations, but includes a decision-making means for processing all the packets outgoing from and incoming to the host platform, that is to say for filtering the packets according to respective security policies. Preferably, the means for processing the packets can comprise a means for encrypting and/or encapsulating with an authentication header and/or an encapsulated security payload an outgoing packet according to the security policy designated by at least one designation parameter included in the outgoing packet, and/or a means for decrypting and/or de-encapsulating in relation to an authentication header and/or an encapsulated security payload an incoming packet according to the security policy designated by at least one designation parameter included in the incoming packet.

Security is thus improved, since no security data or parameter is included or used by the host platform.

All the personal data of the user/owner of the portable device as well as all the security means necessary for instantaneous processing of the packets reside in the device of the invention which, by virtue of the portability of the device, easily follow the user.

In order not to complicate the portable device by extensive management of security policies and advantageously leave the responsibility of this management to the administrator/distributor of the portable devices, the invention recommends assigning management of the policies to a remote management server and thus dynamically managing the security policies on the initiative of the portable device during packet communications.

In this respect, the portable device can comprise a means for initiating a communication with a security policy management server through the network, when the processing means does not recognise any security policy corresponding to the policy designation parameters detected in a packet in order that the server negotiates a security policy through the device and transmits to the device at least one packet containing designation parameters and parameters on which the negotiated policy depends and which are stored and used in the device for processing the packets relating to the negotiated policy.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE INVENTION

Figure 1A:
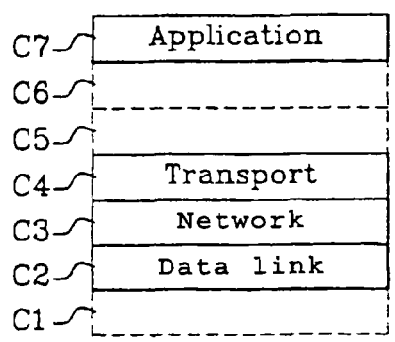
FIGS. 1A and 1B, already commented upon, show respectively the seven protocol layers of the OSI model and the four layers thereof involved in a security means implementation according to the prior art.
Figure 1B:
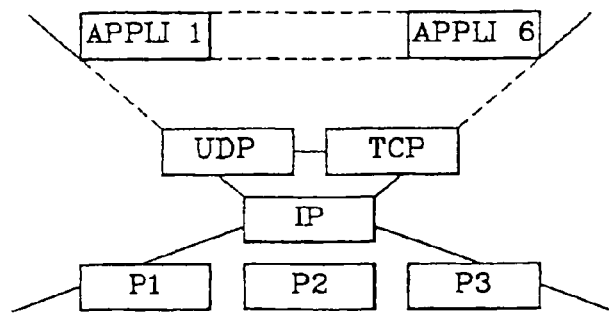
Figure 2:
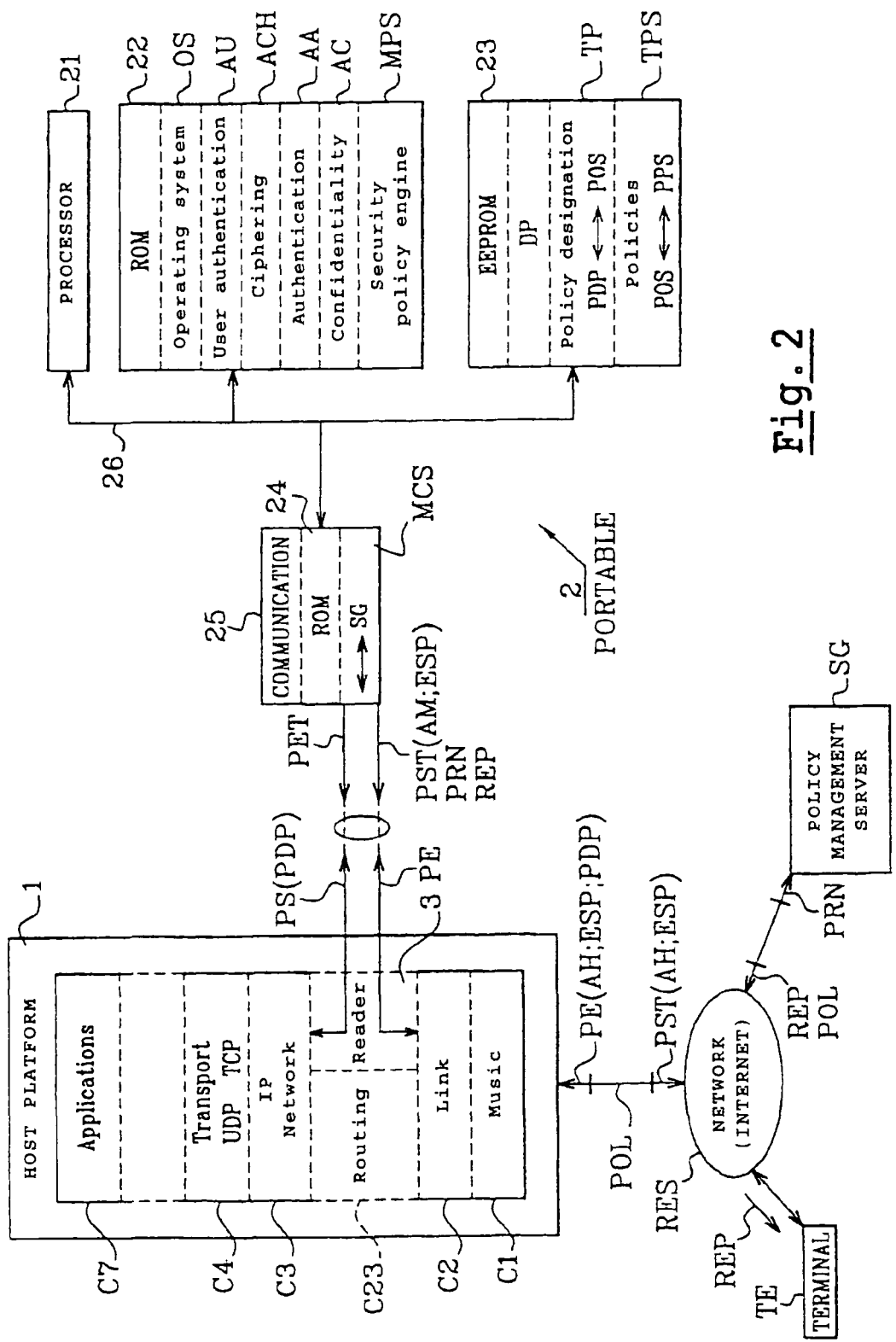
FIG. 2 is a block diagram of a security system with host platform and portable electronic device according to the invention.

With reference to FIG. 2, a security system comprises a host platform 1, such as a personal digital assistant PDA, and a portable electronic device 2 according to the invention in the form of a smart card, referred to as a microcontroller card or integrated circuit card.

According to other variants of the invention, the host platform 1 can be a personal computer PC, in particular a portable one, a mobile radiotelephone, an Internet terminal used as a public terminal, or also an Internet terminal installed in electronic personal objects such as video games consoles, vehicles, television receivers, fixed telephone sets, home automation or electrical household appliances, etc. For all these variants, the host platform 1 is provided for example with an additional smart card reader 3 which is adapted to the technology of the smart card constituting the portable device 2 and which is linked thereto through a bidirectional link 4.

In the platform 1 there are implemented the seven protocol layers C1 to C7 of the OSI Open System Interconnection model as shown schematically in FIG. 2. The bottom physical layer C1 is physically linked to a telecommunications network RES incorporating in particular the Internet. The network layer C3 comprises the Internet protocol IP with no security means. The transport layer C4 comprises for example the TCP and UDP protocols and the last application layer C7 comprises a number of applications.

According to the invention, the host platform 1 comprises a routing layer C23 intermediate between the data link layer C2 and the network layer C3. This routing layer is linked to specific ports of the layers C2 and C3 so as to transmit incoming packets PE from the layer C2 to the layer C3 and outgoing packets PS from the layer C3 to the layer C2 through the reader 3, the bidirectional link 4 and a "packet filter" constituted by the portable device 2. The routing layer C23 thus directs the incoming packets PE and outgoing packets PS to the portable device 2 without any interpretation or any particular processing of these packets. As will be seen subsequently, only the portable device 2 decides to retransmit predetermined incoming packets PE in the form of processed incoming packets PET to the network layer C3 and predetermined outgoing packets PS in the form of processed outgoing packets PST to the link layer C2 after having analysed and processed respectively the packets PE and PS.

The bidirectional link 4 for exchanging packets PE, PET and PS, PST between the platform 1 and the portable device 2 can be a wire link or a wireless link.

When the link is a wire link, it is for example an eight-contact link in accordance with ISO 7816-3 for smart cards or a Universal Serial Bus USB so as to provide a relatively high useful transmission speed with the network RES. The reader 3 is then adapted to receive at least partially the smart card 2 in order to electrically link the reader and the card.

When the link 4 is a wireless link, it can be a radio proximity link of the Bluetooth type which requires no physical contact between the portable device and the host platform. For example, it is sufficient simply to place the portable device 2 constituting the smart card close to the host platform 1, the portable device possibly being kept as a badge in the pocket of the user owning the portable device. The reader 3 is then essentially a Bluetooth radio interface which periodically monitors the presence of one or more portable devices 2 each also provided with a Bluetooth radio interface and situated in proximity to the platform 1, within a very short radius of the order of approximately a few tens of centimeters in order to avoid any malicious eavesdropping. As soon as the platform 1 has recognised the portable device 2 according to a Bluetooth connection establishment protocol, the portable device 2 automatically manages the security of the packet traffic between the data link layer C2 and the transport layer C3 in the platform 1.

Conversely, once the portable device leaves the radio coverage of the host platform, the host platform is completely anonymous and in particular the upper layers C3 to C7 are inaccessible from the network RES.

As shown schematically in FIG. 2, the smart card constituting the portable device 2 contains principally a microprocessor 21, a ROM type memory 22 including an operating system OS for the card and in particular one or more user authentication algorithms AU, authentication algorithms AA, confidentiality algorithms AC and encryption algorithms ACH for packets and a decision-making security policy engine MPS, specific to the IPSec Internet security domain, a non-volatile memory 23 such as an EEPROM memory which contains all the personal data DP, including authentication information for the user/owner of the card, and means AU for authenticating the user/owner with the preceding information, linked to the user/owner of the card 2 and to the supplier of the card, and tables of security policies and parameters TP and TPS, and a RAM type memory 24 intended to exchange data with the host platform 1 through the link 4. The RAM memory 24 can be included in a communication interface 25 in particular for connecting the portable device 2 to the host platform 1 through the Bluetooth type radio proximity link 4. All the components 21 to 25 are connected by an internal bus 26.

Preferably, so as to provide a very high execution speed, the cryptographic algorithms ACH, AA and AC, and the engine MPS, are so-called "hard-wired" algorithms, for example written in VHDL (Very High Description Language) or in a similar language VERILOG and loaded into a CPLD (Complex Programmable Logic Device) or FPGA (Field-Programmable Gate Array) component, and are thus implemented not in software but in hardware in the form of sequential and combinatorial logic.

First, before any access to the security means ACH, AA, AC, MPS processing the packets and implemented in the portable device 2, the portable device which has implemented part of the IP protocol is addressed by an IP address allocated statistically or dynamically, transmitted by the host platform 1 through the link 4 as soon as the reader 3 therein has detected the presence of the device in or in proximity thereto in order to initiate a user authentication.

The means AU for authenticating the user/owner of the card integrated in the portable device 2 make use of biometric recognition techniques, in particular fingerprint reading or voice recognition, analysis and comparison with the data stored in the memory 23 with those read. Thus no personal sensitive data linked to this authentication of the user leaves the device 2 at any time. However, in a variant, traditional means such as a PIN personal identification code are used, but the security is then reduced, or, more simply, user authentication is not provided.

After the authentication means AU have authenticated the user authorised to make use of the portable electronic device 2, the device 2 continues the securing procedure by means in particular of the authentication AA and confidentiality AC algorithms and the security policy engine MPS.

Authentication of the user allows the user and the administrator of the portable electronic devices to access and manually or automatically generate in particular the personal data DP and the parameters PDP and PPS linked to the user.

The IPSec Internet security means are implemented only partially in the portable device 2 which does not internally have the software which manages the negotiation of security policies or parameters associated therewith. The management of security policies and particularly the keys linked to these policies is delegated to one or more management servers SG remote from the platform 1. As soon as the portable device is connected to the host platform 1 and has authenticated the user, it is connected to the global network RES for its own requirements. As will be seen below, each time the portable device 2 needs to negotiate security policies or parameters linked thereto, it automatically connects in a secure manner to the management server SG through the host platform 1 and the network RES. The management server is situated in a secure physical enclosure and is managed for example by the company distributing and administrating the portable devices. The remote management server then processes the parameter request from the portable device and transfers to it the parameters of a security policy necessary for continuing the securing of the traffic of incoming and outgoing packets PE and PS relating to this policy in the host platform 1.

To that end, the portable device 2 comprises the tables of security policies and parameters TP and TPS, the security policy engine MPS, the encryption ACH, authentication AA and confidentiality AC algorithms, and a module MCS included in the communication interface 25 and used to connect the portable device 2 to the management server SG.

In the EEPROM memory 23, the security policy table TP, relatively similar to the "Security Policy Database" table of the IPSec domain, maps security policies POS respectively to policy designation parameters PDP which are detected in incoming and outgoing packets PE and PS. For example, a security policy designation parameter PDP depends on at least one of the following parameters included in a packet PE, PS: an IP destination address in an outgoing packet PS or an IP source address in an incoming packet PE, or at least part of this address, and/or the incoming or outgoing direction of the packet, and/or the transport protocol type, and/or a port number used as a communication or session reference number, etc.

The memory 23 also includes the security policy parameter table TPS, relatively similar to the "Security Association Database" table of the IPSec domain, which associates security policy parameters PPS respectively with the security policies POS listed in the table TP. A given security policy POS can be associated with at least one of the following PPS parameters: type of encryption algorithm ACH, encryption or authentication or confidentiality key, key life duration, type of authentication algorithm AA, type of confidentiality algorithm AC, etc., which are to be used for applying the security policy.

It should be noted that a packet according to the IPSec protocol can comprise an Authentication Header AH and an Encapsulated Security Payload ESP. The authentication header AH or encapsulated security payload ESP comprises in particular a Security Parameter Index SPI and identification data. The index SPI and/or the IP destination address and/or the type of header AH or ESP as policy designation parameters PDP in the table TP contribute towards designating a security policy at the location of the recipient of the packet, such as the host platform 1 for an incoming packet PE, that is to say a security policy POS associated with security parameters PPS in the table TPS.

The authentication data are intended to authenticate the source of the packet and ensure the integrity thereof. One of the authentication algorithms AA selected by the associated policy POS is applied to the authentication header AH in order to non-repudiate the source of the packet, that is to say authenticate the packet as having been sent by the source.

The encapsulated security payload ESP comprises a field of data which are to be protected by ensuring their confidentiality and integrity by one of the confidentiality algorithms AC located in the table TPS in association with the security policy POS designated by at least the index SPI and/or the IP destination address.

A processed packet PST outgoing from the device 2 or an incoming packet PE to be processed in the device 2 can comprise one of the headers AH and ESP, or both, the encapsulated security payload ESP then encapsulating the packet with the authentication header AH.

Initially, before the portable electronic device 2 is put into service for the first time by the user, the administrator pre-loads into the memory 23 of the portable device some security policies POS in association with one or more respective policy designation parameters PDP in the table TP and policy parameters PPS in the table TPS, in order to allow the portable device to initiate communications with remote management servers and to decide by itself the development of the policies and the associated parameters.

For example, when the network layer C3 in the host platform 1 transmits an IP outgoing packet PS to the portable device 2 via the link 4, at the start of a session with another platform, such as a remote terminal TE, the decision-making engine MPS detects the policy designation parameter or parameters PDP in the packet PS and searches for a security policy in the table TP corresponding to the PDP parameters read. If the engine finds a policy POS, it applies this policy to the packet PS according to the parameters thereof read from the table TPS. The packet PS is then filtered and processed by the engine MPS in order to transmit it in the form of an outgoing packet PST, without change, or with its data encrypted, and/or encapsulated with a header AH and/or a header ESP, for example.

The engine MPS can also set aside any outgoing packet PS whose parameters PDP designate an outgoing packet rejection policy.

Once a policy POS is associated with the outgoing packet PS, all the outgoing packets PS and PE of the session in progress are processed according to this policy. In particular, the incoming packets PE transmitted by the remote terminal TE through the network RES to the portable device 2 via the data link layer C2 in the platform 1 and the link 4 are filtered and processed by the engine MPS in order to perform operations which are the inverse to those performed on the outgoing packets. The engine MPS transmits processed incoming packets PET to the network layer C3, for example without change, or with decrypted data, and/or de-encapsulated from a header AH and/or a header ESP, compared with the packets PE.

According to another possibility, at the start of the session, in response to an outgoing given packet PS transmitted by the network layer 3 to the remote terminal TE, or an incoming given packet PE transmitted by the remote terminal TE via the layer C2, the security policy engine MPS does not recognise in the table TP any security policy corresponding to policy designation parameters PDP detected in the given packet PS. The engine then initiates a communication with the management server SG via the connection module MCS and the network RES by reading the IP address of the server SG contained in the memory 23. After mutual authentication of the device 2 and the server SG, the communication is encrypted while including parameters read from the table TPS and either associated with a security policy for communication in particular with the server SG, or associated with a proprietary security policy solely between the device 2 and the server SG.

The portable device 2 transmits at least one negotiation protocol packet PRN to the remote server SG which then transmits a preformatted response packet REP to the device 2. The response packet REP is re-sent by the device 2 to the remote terminal TE with which the device is in communication and negotiation. As long as the device 2 has not received a predetermined policy packet POL, the device periodically maintains a cycle of transmitting a policy negotiation protocol packet PRN to the server SG and re-sending a response packet REP to the terminal TE.

During these cycles, the server SG assists the portable device in the negotiation of a security policy, that is to say defines the parameters PPS on which a security policy POS depends, for example according to information on the terminal TE designated by its address contained in the negotiation protocol packet PRN compared with the personal user data DP and possibly with the other security policies relating to the device 2. Finally the server SG transmits to the device 2 at least one packet POL containing the designation of the security policy POS to be applied to the packets exchanged between the terminal TE and the device 2, the designation parameters PDP for this policy and the parameters PPS defining this policy. The parameters PDP and PPS of the formulated policy POL are immediately stored in the tables TP and TPS of the memory 23 in response to the packet POL detected in the connection module MCS. The engine MPS then stops resending the negotiation protocol packets PRN and response packets REP, and uses the parameters PPS of the policy which has just been negotiated and stored for securing at least the outgoing packets PS and de-securing the incoming packets PE exchanged with the terminal TE.

According to another possibility, negotiation steps between the server SG and the device 2 similar to those described above are initiated by the decision-making engine MPS when the latter notes that at least one of the parameters PPS, such as keys, on which the security policy for the exchanges with the terminal 2 depends must be changed because the parameter is at the end of its life, or because the session exceeds a predetermined duration, or because a silence succeeding a packet transmitted by the terminal TE, without being followed by a packet PE or PS, exceeds a predetermined duration. In this case, as soon as the terminal TE again makes itself known to the device 2, the latter renegotiates a security policy, that is to say at least one policy parameter PPS.

The portable device 2 thus dynamically delegates policy creation and management of policy parameters, such as keys, to the management server SG, this delegation being transparent to the remote terminal TE.

The following main advantages emerge from the preceding description of the security system according to the invention.

The portable electronic device 2 itself partially implements the IPSec security means represented principally by the algorithms ACH, AA and AC, the tables TP and TPS and the decision-making security policy engine MPS. The prior verification of the identity of the user by means of a comparison between biometric authentication information obtained by acquisition or data that only the user/owner knows, for example the PIN code, and reference data contained in the EEPROM memory 23 of the portable device, and the association of specific security policies POS with the authentication information in the portable electronic device 2 implement the link with the user. The loss of all links between the user and the platform is no longer possible compared with the prior art according to which the network layer C3 incorporates the security means.

The portable electronic device 2 has in the table TPS all the security parameters PPS for a particular user. The portable device can therefore be removed from one platform in order to then be received by another platform according to the invention. The removable security means according to the invention are therefore portable from one platform to another, compared with the prior art according to which a particular network node represented by the host platform had to be dedicated to the user, since the security means resided in the network layer of the platform.

The security means contained in the portable device 2 can advantageously be inserted at the level of the routing layer C23 intermediate between the link layer C2 and network layer C3, of any platform whatsoever not having security means. The connecting of the portable device with this platform does not modify the rest of protocols in the layers, the operating system and all the applications accommodated in the platform. All the software programs situated in the layers above the network layer C3 have the benefit of the security means implemented in the portable device.

The invention also remedies the complexity of deployment of the public key infrastructure according to the prior art. This is because the portable electronic device 2 is designed according to principles of manufacture, initialisation and distribution like those known for smart cards, and each portable device being linked to at least one authorised user has its security means personalised before the portable device is put into service for the first time by the user. Delegation of the management of security policies, and in particular public keys, to at least one remote management server, combined with the advantages of personalisation of the portable device, facilitates deployment of the public key infrastructure.

Compared with the security applications implemented in the application layer of the known smart cards, the portable electronic device 2 of the invention at least partially implements the security means without the security depending on the host platform to which the portable device is connected during the decision-making and data securing phases. This is because the device 2 itself chooses, by means of the engine MPS, the security policies POS and therefore the security parameters PPS, such as the keys and associated cryptographic algorithms, itself selects the processed packets PET, PST to be retransmitted according to the policies chosen, and itself performs by means of the algorithms AA, AC and ACH the phases of authentication, confidentiality and encryption (decryption) of the packets PE and PS. The keys and more generally the security parameters PPS are neither entrusted to, nor present on, the host platform 1 at any time.

Once the portable device 2 is moved away from the platform 1, that is to say is physically disconnected or is situated outside the radio coverage of the platform, no communication relating to the user of the portable device can persist; in particular communication channels reserved for a virtual private network VPN to which the user has access cannot be used subsequently, the platform 1 becoming anonymous. The invention thus improves the security of the use of keys.

The invention also remedies the drawback of applications based on smart cards which were portable and able to be distributed generically to other applications or protocols, the number of which was limited because of the implementation of security means in particular applications which were most often proprietary. On the contrary, the implementation of removable security means just below the network layer C3 in the host platform according to the invention allows the securing in a transparent manner of protocols or applications installed in the host platform with no particular modification of these protocols or applications.

The invention claimed is:

1. A portable electronic device connectable in a removable manner to a host platform linked to a packet network, comprising a means for storing security policies, a means for detecting security policy designation parameters in packets outgoing from the platform to the network and packets transmitted by the network and incoming to the platform, a means for processing the outgoing and incoming packets respectively according to security policies designated by the detected designation parameters, and a means for initiating a communication with a security policy management server through the network when the processing means does not recognize any security policy corresponding to the policy designation parameters detected in a packet, to enable the server to negotiate a security policy through the device and transmit to the device at least one packet containing designation parameters and parameters on which the negotiated policy depends and which are stored and used in the device for processing packets relating to the negotiated policy.

2. A device according to claim 1, in which the initiation means initiates a communication with the management server when at least one of the parameters on which a security policy depends has to be changed.

3. A device according to claim 1, in which a cycle of transmitting a policy negotiation packet from the device to the server, transmitting a response packet from the server to the device and re-sending the response packet from the device to a platform with which the device is in communication, is maintained as long as the server is formulating the security policy.

4. A device according to claim 1, further comprising means for authenticating a user prior to packet processing.

5. A device according to claim 1, further comprising a means for connecting the device to the host platform through a radio proximity link.

6. A device according to claim 1, in which the means for processing comprises a means for encrypting and/or encapsulating an outgoing packet with an authentication header and/or an encapsulated security payload according to the security policies designated by the detected designation parameters included in the outgoing packet, and/or a means for decrypting and/or de-encapsulating an incoming packet in relation to an authentication header and/or an encapsulated security payload according to the security policies designated by the detected designation parameters included in the incoming packet.

7. A device according to claim 1, in which a security policy designation parameter depends on at least one of the following parameters included in a packet: at least part of the destination or source address, direction of the packet, transport protocol type, communication or session reference number, identifier in an authentication header or encapsulated security payload of the packet.

8. A device according to claim 1, in which a security policy is associated with at least one of the following security policy parameters: type of encryption, keys, parameter life duration, type of authentication, type of confidentiality, session duration, silence between packets.

9. A smart card connectable to a host linked to a packet network, said smart card comprising:
   a table stored in a memory that associates security policy designation parameters with security policies;
   at least one algorithm stored in a memory that performs a predetermined type of processing on packets exchanged between the host and the network, in accordance with a security policy; and
   a security policy engine that detects security policy designation parameters in packets that are exchanged between the host and the network, and determines if a security policy is stored in said table that is associated with the detected security policy designation, wherein
   if said security policy engine recognizes a security policy associated with the detected security policy designation parameter from said table, said security policy engine applies a stored algorithm to packets exchanged between the host and the network in accordance with the determined security policy, and
   if said security policy engine does not recognize any security policy that corresponds to the detected policy designation parameters, said security policy engine communicates with a security policy management server through said network to enable the server to negotiate a security policy through said smart card.

10. The smart card of claim 9, wherein if said security policy engine does not recognize any security policy and obtains, from the server, a corresponding security policy for the detected parameter, said security policy engine further applies an algorithm associated with the obtained security policy to packets containing the detected parameter.

11. The smart card of claim 9, wherein if said security policy engine does not recognize any security policy and obtains, from the server, a corresponding security policy for the detected parameter, said security policy engine further stores the obtained security policy in said table, in association with the detected security policy designation parameter.

12. A method for implementing security policies in a host device that communicates with a network by means of a multi-layer Open Systems Interconnection model, comprising the following steps:
   intercepting packets as they are transferred between two adjacent layers of said model within the host;
   providing the intercepted packets to a portable electronic device that communicates with an interface interposed between said two layers;
   detecting, in said device, a security policy designation parameter in an intercepted packet;
   determining, in said device, if a security policy that is associated with the detected security policy designation parameter is stored in said device;
   if a security policy associated with the detected security policy designation parameter is stored, processing the intercepted packet in said device with at least one algorithm that relates to the determined security policy;
   and if a security policy associated with the detected security policy designation parameter is not stored, communicating with a security policy management server to obtain a security policy and processing the intercepted packet in said device with at least one algorithm that relates to the obtained security policy; and
   providing the processed packet to the host via said interface to complete the transfer between said layers.

13. The method of claim 12, wherein said two adjacent layers comprise the link and network layers of the Open Systems Interconnection model.

14. The method of claim 12, wherein said portable electronic device comprises a smart card.

15. The method of claim 14, wherein said interface comprises a smart card reader.

* * * * *